United States Patent [19]
Kretzmar et al.

[11] Patent Number: 5,912,615
[45] Date of Patent: Jun. 15, 1999

[54] ELECTRIFIED THEFT/CAR-JACK PREVENTION DEVICE FOR USE WITH MOTOR VEHICLES AND METHODS OF USE

[76] Inventors: Allan J. Kretzmar, 5000 S. Centinela Ave. #315, Los Angeles, Calif. 90066; Neal Kakimoto, 936 Lehua Ave. #211, Pearl City, Hi. 96782

[21] Appl. No.: 08/959,733

[22] Filed: Oct. 28, 1997

Related U.S. Application Data

[63] Continuation of application No. 08/801,455, Feb. 18, 1997, abandoned, which is a continuation of application No. 08/311,745, Sep. 23, 1994, abandoned.

[51] Int. Cl.$^6$ .................................................. B60R 25/10
[52] U.S. Cl. ...................... 340/426; 340/428; 307/10.2; 180/287; 361/232; 42/1.13; 89/1.11
[58] Field of Search .................. 340/426, 428, 340/430, 539, 574, 441, 466, 463; 307/10.2, 10.3, 10.4, 10.5, 10.6; 180/287; 361/232; 42/1.08, 1.13, 84; D22/117; 89/1.11

[56] References Cited

U.S. PATENT DOCUMENTS

| | | | |
|---|---|---|---|
| 2,022,725 | 12/1935 | Lazarus et al. . | |
| 2,892,181 | 6/1959 | Benson et al. . | |
| 3,242,460 | 3/1966 | Morrell . | |
| 3,622,978 | 11/1971 | Lipschutz | 340/457 |
| 3,724,744 | 4/1973 | Carnahan | 231/7 |
| 3,803,463 | 4/1974 | Cover . | |
| 3,998,459 | 12/1976 | Henderson et al. | 273/84 R |
| 4,004,273 | 1/1977 | Kalogerson | 340/671 |
| 4,092,695 | 5/1978 | Henderson et al. | 361/232 |
| 4,162,515 | 7/1979 | Henderson et al. | 361/232 |
| 4,486,742 | 12/1984 | Kudo et al. | 340/384.6 |
| 4,713,725 | 12/1987 | Kroll | 361/232 |
| 4,821,017 | 4/1989 | Tanami et al. | 340/430 |
| 4,901,054 | 2/1990 | Waterman | 340/426 |
| 4,924,206 | 5/1990 | Ayers | 340/426 |
| 4,930,392 | 6/1990 | Wilson | 89/1.11 |
| 4,990,890 | 2/1991 | Newby | 340/539 |
| 5,172,094 | 12/1992 | Stadler | 340/430 |
| 5,245,330 | 9/1993 | Wassink . | |
| 5,298,878 | 3/1994 | Smith | 340/426 |
| 5,382,941 | 1/1995 | Arzoumanian | 340/426 |
| 5,396,215 | 3/1995 | Hinkle | 340/426 |
| 5,412,370 | 5/1995 | Berman et al. | 307/10.2 |
| 5,444,430 | 8/1995 | McShane | 307/10.2 |
| 5,463,372 | 10/1995 | Mawyer, Sr. | 307/10.3 |
| 5,670,933 | 9/1997 | Hayashi | 340/426 |
| 5,706,909 | 1/1998 | Bevins et al. | 180/273 |
| 5,708,409 | 1/1998 | Schwimmer et al. | 340/426 |

FOREIGN PATENT DOCUMENTS

91/4493   6/1991   South Africa .

*Primary Examiner*—Nina Tong
*Attorney, Agent, or Firm*—Richard T. Ito

[57] ABSTRACT

A device for minimizing car theft and car-jacking, the device including an immobilizing means, the immobilizing system including an arming mechanism. Upon the opening of the car door, a timer mechanism is activated. Upon the expiration of the time period, when the wheels of the motor vehicle have completely stopped and the brakes have been applied, the engine is killed, lights are flashed and the audio signal generator is activated. In addition, the immobilizer system activates a interface system, which provides a warning to the unauthorized user of the motor vehicle of an imminent shock being applied to the seats of the motor vehicle. Upon expiration of another time delay period, electric shocks are applied to the seat of the car and, optionally, a visual location indicator, such as a smoke generator may be triggered. Methods of use and other embodiments are disclosed.

13 Claims, 8 Drawing Sheets

ELECTRIFIED THEFT/CAR-JACK PREVENTION DEVICE FOR USE WITH MOTOR VEHICLES AND METHODS OF USE

This application is a continuation of application Ser. No. 08/801,455 filed Feb. 18, 1997, now abandoned, which is a continuation of application Ser. No. 08/311,745 filed Sep. 23, 1994, now abandoned.

BACKGROUND OF THE INVENTION

1. Field of Invention

The present invention relates generally to improvements in theft prevention devices and the like, and, more particularly, to a new and improved device for providing a deterrent electrical shock to an unauthorized user of a motor vehicle, wherein the motor vehicle, and the criminal, can be removed from the immediate presence of the victim and, wherein, a warning is provided prior to the administration of the shock to the unauthorized operator.

2. Description of the Prior Art

In the field of crime prevention, it has been common practice to employ shock generating devices, such as "stun-guns", to halt a thief from successfully effecting a physical attack. However, "stun-guns" have not proved entirely satisfactory in all situations because of the difficulty in being able to directly apply the electrical shock to the criminal.

One presently available application of such shock generating devices is the portable hand held shock device (U.S. Pat. No. 4,162,515, issued to Gary A. Henderson). This patent discloses a hand-held shocking device. Upon the activation, a visible and audible electrical discharge arcs between two prongs placed closely adjacent to or abutting a target. This is usually sufficient to ward off the target, be it a undesirable person or animal. Other hand-held electrical shock deterrent devices have been disclosed. See also U.S. Pat. No. 4,092,695 issued to Henderson; U.S. Pat. No. 3,998,459 issued to Henderson; U.S. Pat. No. 3,724,744 issued to William M. Carnahan; and U.S. Pat. No. 3,242,460 issued to B. A. Morrell. Unfortunately, these types of devices do not discriminate between victim and criminal. In addition, each of the devices requires the user to be in the physical presence of the target to apply the shock thereto.

Despite these difficulties, attempts have been made to apply electric shock technology to the motor vehicle theft situation. One such attempt can be found in South African Patent No. 91/4493, issued to Adriaan J. Booysen. But the Booysen device requires an additional remote activation device and does not warn authorized operators of the impending shock. Furthermore, the Booysen device is activated remotely, without considering whether the so-equipped motor vehicle is moving, stationary, or in a manner safe for the car-jackers or passengers. As a result, even though an unauthorized person may be operating the equipped motor vehicle, activation of the shock mechanism while the car is in motion could lead to additional problems.

Others have taught motor vehicle theft prevention, by authorized user disabling the vehicle. U.S. Pat. No. 5,298,878, issued to Lorenzo L. Smith teaches the disengagement of the ignition after a predetermined time has expired upon engagement by a foot switch. After the expiration of a second period of time, a horn is activated and tear gas is dispensed through the ventilation system. U.S. Pat. No. 4,004,273 issued to Kalogerson teaches the disabling of the motor vehicle engine, triggered when the engine reaches a predetermined speed. U.S. Pat. Nos. 3,242,460, issued to B. Morrell and 2,892,181 issued to Ralph A. Benson, et al, teach the disengagement of the automobile's ignition after a time delay. U.S. Pat. No. 2,022,725 issued to A. Lazarus, et al, teaches of a hidden switch to interrupt the fuel supply. However none of these devices recognize that disengagement of the engine while the car is moving can result in additional problems as discussed with reference to Boynston.

Still others have sought to deter the theft of the motor vehicle by incorporating mechanisms that draw attention to the vehicle, e.g., by the activation of the motor vehicle's horn (U.S. Pat. No. 3,622,978 issued to Paul Lipschutz; U.S. Pat. No. 4,924,206 issued to Robert Ayers). None of these devices recognize the need for the removal of the motor vehicle from the immediate presence of the authorized user, the safe deactivation of the motor vehicle when it is stationary or the warning of the unauthorized user of an impending activation of the theft prevention device.

Hence those concern with the development and use of anti-theft devices for motor vehicles have long recognized the need for an anti-theft device which can be activated in a stolen motor vehicle outside the presence of the owner. In addition, there has been a long recognized need for providing a warning to operator of the motor vehicle. With the introduction of the present invention as embodied in the electrified anti-carjacking/anti-theft vehicle protection device, any unwarranted or undesired applications have been minimized. The present invention clearly fulfills all of these needs, while devoting specific attention to the safety of the owner, vehicle, passenger, onlookers, and even the criminals as well by ensuring that the automobile has come to a complete stop prior to activation.

SUMMARY OF THE INVENTION

Briefly and in general terms, the present invention provides a new and improved apparatus for administering a deterrent electrical shock to unauthorized operators of a motor vehicle.

Basically, the present invention is directed to an improved motor vehicle anti-theft device which delays applying an electrical shock to the motor vehicle's seat until after a warning has been issued. Features are incorporated so that the motor vehicle can be removed from the immediate presence of the authorized user prior to the generation and application of a shock to an unauthorized operator and or passengers of the motor vehicle. Audio warnings are also provided prior to the discharge of the electrical shock to minimize undesired or inadvertent discharge of the device in non-theft situations.

In one preferred embodiment of the present invention, the system includes a car immobilizer system, an interface system, and a deterrent system. More particularly, in one preferred embodiment, when the integrity of the car is violated, for example a door of the motor vehicle is opened, triggers mounted adjacent thereto are tripped, arming the anti-theft system embodying the features of the present invention. Once the system has been armed, an electrical impulse is generated which is conveyed to start a first timing mechanism. After the expiration of a pre-set period of time, a period of two-and-one-half minutes in one current embodiment, the fulfillment of two conditions will immobilize the motor vehicle. In one embodiment, these required conditions include the brakes of the motor vehicle being applied and the wheels of the motor vehicle coming to a complete stop. Upon the fulfillment of these conditions after the expiration of the initial time delay period, electrical impulses are generated to kill the engine of the motor vehicle, activate the flasher units of the motor vehicle and trigger a siren or other audio attention getting device.

In addition, an electrical impulse is generated by the immobilizer system to trigger an interface system. The interface system generates and transmits an synthesized verbal warning to the operator of the motor vehicle. The verbal warning, instructs the unauthorized operator to exit the car and warns the operator of imminent activation of the shock generator. Concurrent with the verbal warning, a piezo buzzer beeps over regular intervals for a predetermined delay period, in one embodiment at one second intervals over a total thirty second period. In another embodiment, the countdown is accomplished by the use of a preprogrammed verbal countdown. At the expiration of the delay period, the interface activates the deterrent system, which includes, in the preferred embodiment, a shock generator unit. The shock generator unit, positioned adjacent the driver or unauthorized operator in the motor vehicles's seats, then transmits an electrical shock to the unauthorized operator or passenger. Optionally, a visual locator, for example a smoke generator unit, may also be activated by the interface.

From the above description, it can be readily seen that the present invention presents a new and useful apparatus for deterring unauthorized use of a motor vehicle while protecting the authorized operator from the same.

These and other objects and advantages of the present invention will become more apparent from the following detailed description, taken in conjunction with the accompanying drawings, which illustrate, by way of example, the principles of the invention.

DETAILED DESCRIPTION OF THE INVENTION

As shown in the exemplary drawings, an improved anti-theft/anti-carjacking device for use in combination with motor vehicles is shown and constructed in accordance with the present invention. The improved anti-theft/anti-carjacking device is provided for separating the motor vehicle from a first location to a second location apart from the authorized user/operator; immobilizing the motor vehicle at the second location; and deterring the unauthorized driver/operator from using the motor vehicle by applying an electrical shock thereto. In addition, the improved anti-theft/anti carjacking device provides for delaying the administration of the shock; warning the operator of an impending shock during the delay; and waiting until the motor vehicle have come to a complete stop before applying an electrical shock to the operator.

Figure 1:
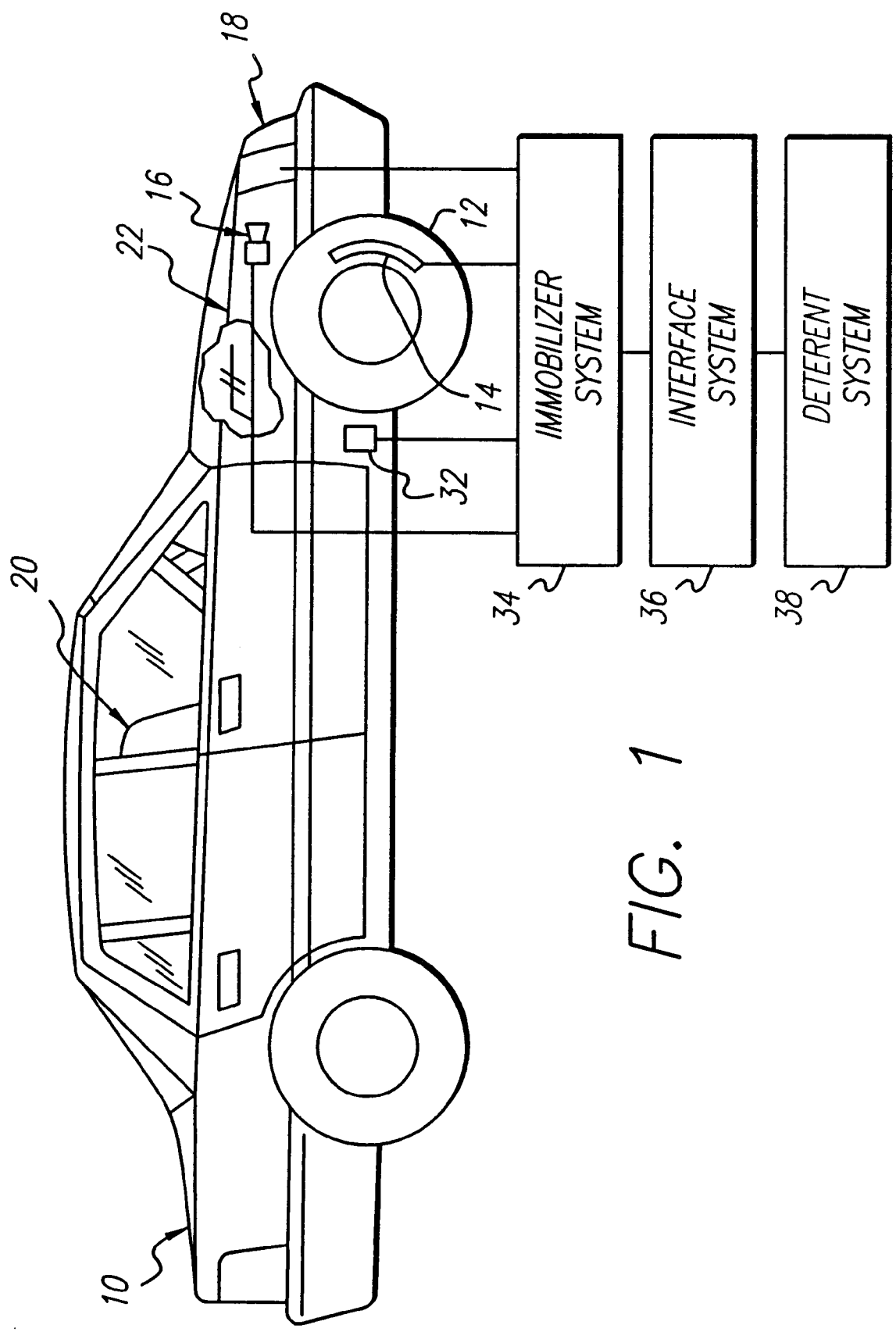
FIG. 1 is a combination block diagram and lateral elevational view of a motor vehicle equipped with an anti-theft prevention system embodying the features of the present invention.

Referring now to FIG. 1 of the drawings, there is shown an overall block diagram of the motor vehicle theft prevention device 8 of the present invention in combination with a motor vehicle 10 having a plurality of rotatable wheels 12, a brake application system 14, a audio signal generator 16, lights 18, seats 20, and engine 22. A wheel rotation sensor system 32 provides information to an immobilizer system 34. After fulfilling predetermined conditions indicating that the motor vehicle 10 has come to a complete stop and the brake application system 14 has been applied, the immobilizer system turns off the engine 22, activates the lights 18 and triggers the audio signal generator 16. This allows the motor vehicle to be moved from a first location to a second location. If the motor vehicle is being taken from the owner or authorized operator when the authorized operator is actually present at the first location, this allows the motor vehicle to be separated from the authorized operator. The immobilizer system 34 is also electrically connected to and triggers an interface system 36. The interface system 36 provides a synthesized verbal warning to the operator prior to the activation of a deterrent system 38, in one embodiment an electrically connected shock generation system 38. This enables the authorized operator to halt the sequence before the deterrent or shock generation system 38 is activated. Alternatively, the interface system 36 enables an unauthorized operator to exit a stationary motor vehicle 10 before the deterrent or shock generation system 38 is activated.

Figure 2:
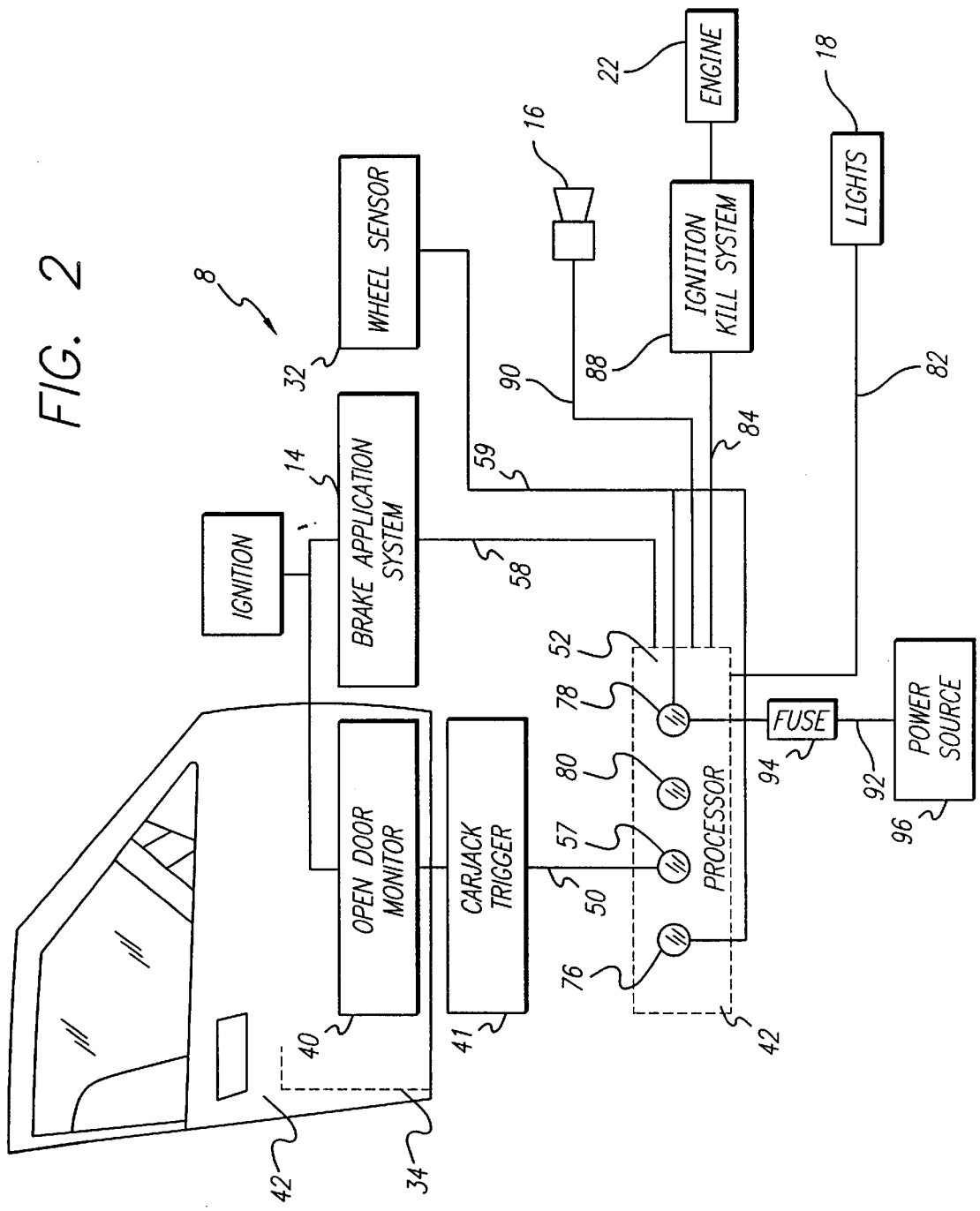
FIG. 2 is a block diagram of the motor vehicle theft prevention system of FIG. 1.

Referring now to FIG. 2 of the drawings, there is shown the immobilizer system 34 embodying the features of the present invention. The immobilizer system 34 is preferably of the type similar to that manufactured and sold under the brand name "Carjack Elite" by Peripheral Electronics of San Diego, Calif. An open door monitor 40, which includes an immobilizer trigger 41, can be mounted in at least one door 42 of the motor vehicle 10. Those skilled in the art will recognize that any or all of the motor vehicle's doors, hoods, lids or other selectively opened apertures can be so wired. Violating the integrity of the door 42, for example by opening it with the ignition in the "on" position, activates the immobilizer trigger 41. The immobilizer trigger 41 will generate an impulse over a line 50 to a processor 52.

Figure 3:
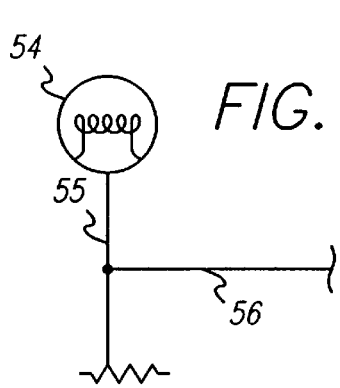
FIG. 3 is a simplified electrical diagram illustrating an embodiment of the door opening trigger of the theft prevention system of FIG. 1.

Referring now to FIG. 3, in the one embodiment, line 53 may be connected to the motor vehicle's interior or dome light 54 or the line 55 carrying the power to illuminate such light, such that opening the door will turn on the interior dome light, in turn providing an impulse to the processor 52 from line 55 or dome light 54 to processor 52 over line 56.

Referring back to FIG. 2, upon receipt of the signal or triggering impulse by the processor 52, a first visual indicator 57 may be illuminated to indicate that the immobilizer system 34 has been activated. In addition, upon receipt of the triggering impulse, the processor 52 defines and begins a first pre-determined time delay period, in the preferred embodiment, a period of about two and one-half minutes, which allows sufficient time for the vehicle to be driven to a second position, a short distance away from a first position. If the authorized operator has been left at the first position, he/she will be separated from the unauthorized user, avoiding a confrontation between the two. The processor 52, after the first time delay period has elapsed, waits for impulses from the brake application system 14 and the wheel rotation sensor system 32 over lines 58 and 59 respectively.

Figure 4:
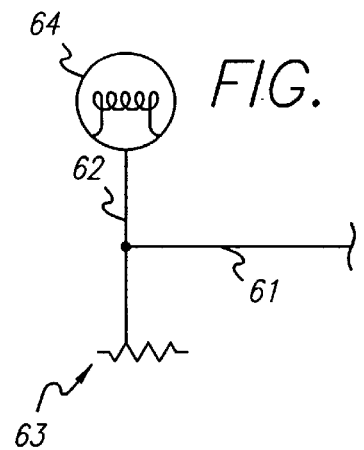
FIG. 4 is a simplified electrical diagram illustrating an embodiment of the brake application indicator of the theft prevention system of FIG. 1.

The impulse indicating that the brake application system 14 has been activated could be effected in a variety of ways. In one of the preferred embodiments, as shown in FIG. 4, line 61 is connected to a brake light activation line 62 of a motor vehicle 10's brake light system 63 so that when the brake lights 64 of the motor vehicle 10 are activated, an impulse is also carried or transmitted over line 61 to the processor 52.

Figure 5:
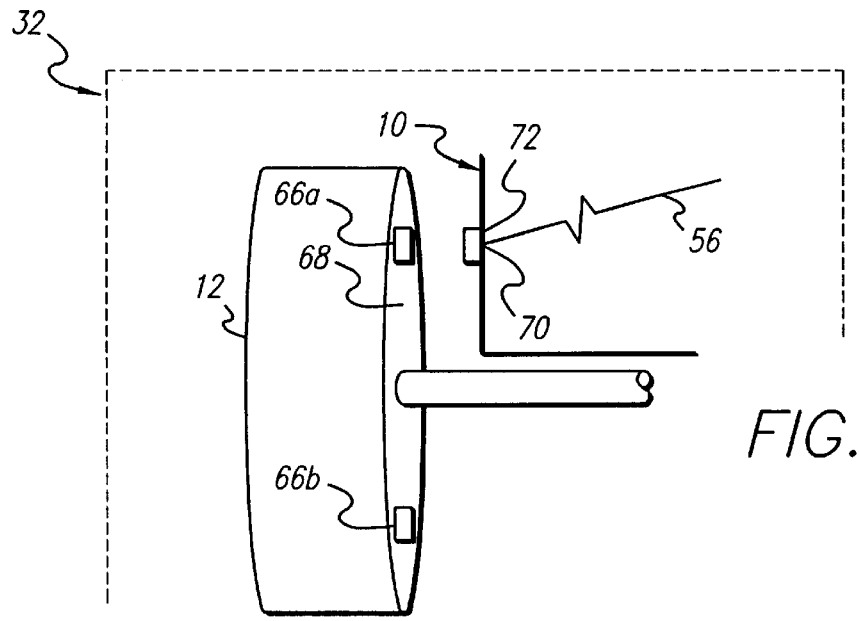
FIG. 5 is a front elevational view of the wheel sensor unit of the theft prevention system of FIG. 1 in combination with a motor vehicle.

Referring now to FIG. 5, the wheel rotation sensor system 32 is utilized to establish that the wheels 12 of the motor vehicle 10 have come to a complete stop and provide another triggering impulse to the processor 52. Wheel rotation sensor system 32 is mounted adjacent to the wheels 12 of the motor vehicle 10, although those skilled in the art will recognize that any fixed and rotatable portion of the motor vehicle can be utilized, for example, the driveshaft, a rotatable portion, and a frame member, a fixed portion. The main criteria for the selection of the rotatable portion is that its revolutions per minute is a mathematical function of or proportional or related to the speed of the motor vehicle. Any wheel sensor system 32 of the type similar to that manufactured and sold in combination with the car immobilizer system 34 under the brand name "CARJACK" by Peripheral Electronics of San Diego, Calif. is sufficient for the purposes of this application.

In one particular embodiment, at least two magnets 66a and 66b are mounted on the rotatable portion 68 of the motor vehicle 10's wheels 12. A magnetic sensor 70 is mounted on a non-rotating or fixed portion 72 of the motor vehicle 10, such that rotation of a wheel 12 will pass one of the magnets 66a or 66b sufficiently adjacent to the magnetic sensor 70 to magnetically affect it and generate an impulse. In one preferred embodiment, the distance between the magnetic sensor 70 and the magnets 66a and 66b is about one-half inch at their closest point.

Figure 6:
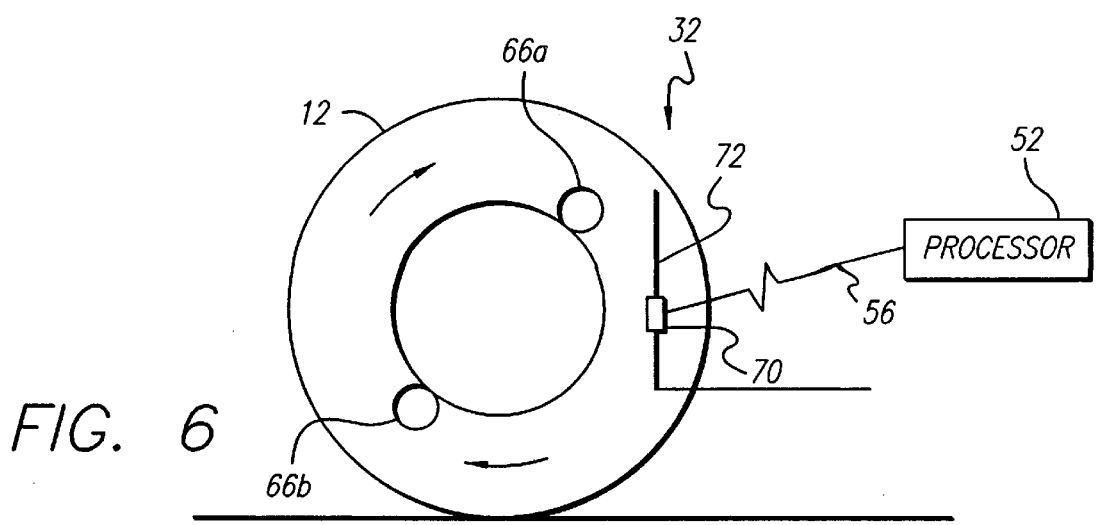
FIG. 6 is a side elevational view of the wheel sensor of the theft prevention system of FIG. 1 in combination with a motor vehicle.

As shown in FIG. 6, in one embodiment, two magnets 66a and 66b are positioned equidistantly opposite each other on a rotatable portion 68, for example the surface of the wheel 12. As the wheel 12 rotates through one complete revolution, as indicated by the arrows, the magnets 66a and 66b will each pass adjacent the magnetic sensor 70 once, providing impulses along the line 56. As a result, the generated impulses are a function of, or are in direct proportion to, the rotation of the rotatable portion 68 and thus the motor vehicle 10's speed. The generated impulse is carried over line 56 to the processor 52.

Referring back to FIG. 2, a second visual indicator 76, which may be in the form of a light emitting diode, will flash or blink once for each time the magnets 66a and 66b pass adjacent the magnetic sensor 70. Thus, the faster the second visual indicator 76 is blinking or flashing within a given time frame, the faster the wheel 12 is rotating. Those skilled in the art will recognize that increasing the number of magnets 66 will increase the number of flashes per one revolution of the wheel 12. However, once selected, the number of magnets utilized will be constant. As a result, the frequency of flashes will still be a function of the rotation of the wheel 12, that is, an increase in the speed of the vehicle, rotations of the wheel, will result in an increase in the number of flashes per unit time. If the brake application system 14 has been applied, but the wheel rotation sensor 32 indicates that the wheels 12 are still rotating, then a third visual indicator 78 is activated. When the brake application system 14 is applied, and the rotatable wheels 12 have come to a complete stop, a fourth visual indicator 80 is activated.

Once the wheels 12 have stopped and the brake application system has been applied, after the expiration of the pre-determined time delay period defined and generated by the processor 52, the processor 52 activates various deterrent systems in response to the fulfillment of the predetermined conditions, as indicated by the wheel rotation sensor monitor system 32 and brake application system 14. For example, the processor 52 may generate an impulse carried over line 82 to the lights 18. In one preferred embodiment, the output is carried over line 82 to trigger or activate the motor vehicle 10's flasher/hazard light system. A second output may be generated by the processor 52 and carried over line 84 to trigger or activate an ignition kill system 88 which in turn is connected to the engine 22, shutting it off. This effectively immobilizes the motor vehicle 10 at the second location, in one scenario apart from the immediate location of the authorized operator. A third output is carried from processor 52 over line 90 to trigger, activate or engage the audio generator 16, in one preferred embodiment a horn. Power is supplied to the immobilizer system over line 92 through fuse 94 from source 96, for example an automobile battery.

Figures 1, 7:
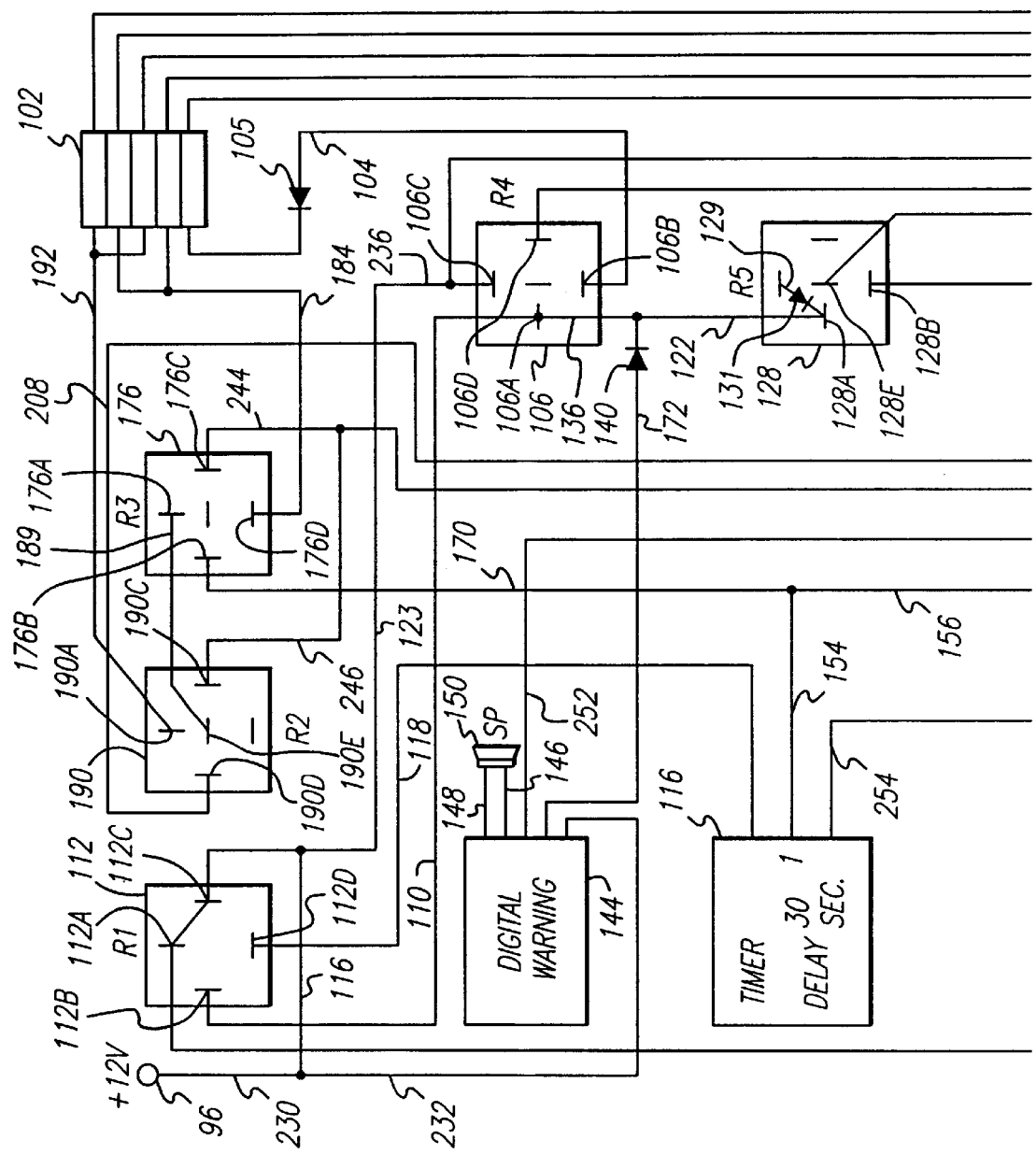
FIG. 7 is an electrical schematic of the interface system of the present invention.
Figures 2, 7:
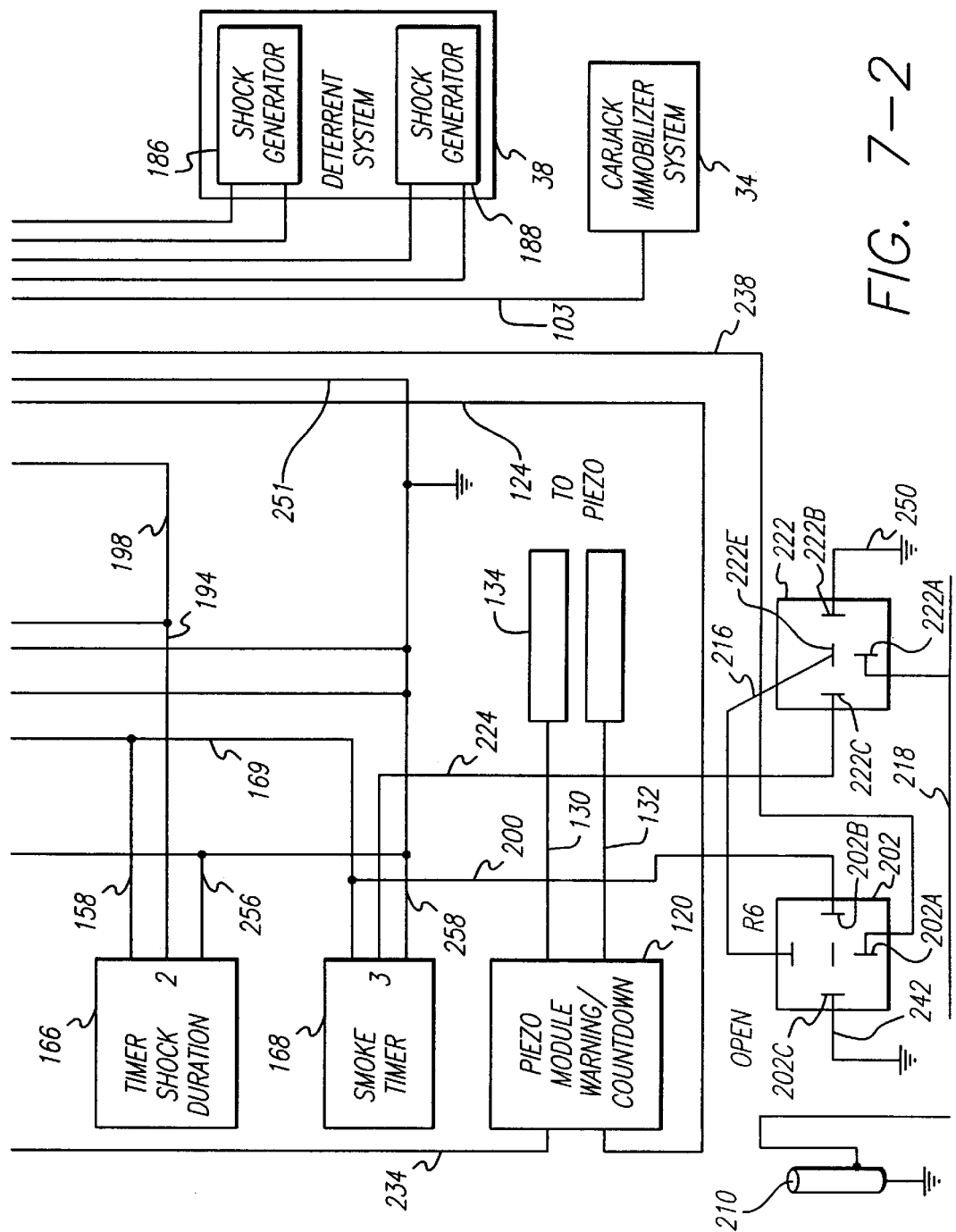

Referring now to FIG. 7, there is shown the interface system 36 of the present invention to delay the application of and provide warning to the operator of the vehicle of imminent triggering of deterrent systems 30, for example, a shock or smoke generating system. An input terminal 102 receives input generated by the immobilizer system 34 over line 103. The signal is carried over line 104 to first interface relay 106. For the purposes of this embodiment, those skilled in the art will recognize that electrical relays of the type having five prongs or terminals generally designated "30", "85", "86", "87" and "87a". For the purposes of clarification, for each electrical relay, the respective connection points will be designated "a" for the "30" input, "b" for the "85", c for the "86" input, "d" for the 87 input and "e" for the 87a input. The signal from the immobilizer system 34 is carried over line 104 through diode 105 to relay 106 through terminal 106b, tripping relay 106.

Output from relay 106 is carried through terminal 106a over line 110 to a second interface relay 112 through terminal 112b. The signal trips relay 112. Output from relay 112 is carried from terminal 112d to a first timer 116 over line 118, delaying at least part of the signal from the immobilizer system 34 for a first predetermined interface time delay period. In one embodiment the first predetermined interface time delay period is about thirty seconds. Output from relay 112 is also carried to an audio warning generator 120, in one contemplated embodiment a piezo module, through line 124 through terminals 128a and 128e of third interface relay 128, activating or turning the piezo module on. Terminal 128a is also connected to line 129 and diode 131. The piezo module 120 through lines 130 and 132 and piezo 134 generates an audio tone or beep at regular predetermined intervals, for example in the preferred embodiment, a tone at one second intervals. This provides an audio warning to the operator that the electrified anti-theft system of the present invention is about to enter the shock generating mode. Output from first relay 106 also is carried from terminal 106a over lines 136 and 172 through second diode 140 to the voice synthesizer unit 144. As a result, the synthesizer 144 is activated. The synthesizer 144 then sends impulses over lines 146 and 148 to speaker 150 which begins giving an articulated verbal warning, that is a digitally recorded human voice warning of an imminent electrical shock to the operator as more fully described later in this application. For the purposes of this invention, the articulated verbal warning may be a warning given in a desired spoken language. The inventor contemplates that for different countries, different spoken warnings will be given, according to the particular country the system of the present invention is used. The inventor also contemplates that the verbal warning generated by the voice synthesizer unit would generate a countdown to zero from a thirty second starting point. For the purposes of this invention, the voice warning system similar to the type sold under the brand name DIGIVOICE, manufactured by Altair Security of Oceanside, Calif. is sufficient for the purposes of this invention. In the preferred embodiment, the voice warning provides a first audio warning and the piezo provides a second audio warning to the operator that the electrified anti-theft system of the present invention is about to enter the shock generating mode.

Upon the termination of the pre-determined thirty second delay period programmed into and thus determined or defined by first interface timer 116, output is carried from timer 116 over lines 154, 156, 158 and 169 to second interface timer 166 and third interface timer 168 respectively, initiating their respective pre-determined delay or countdown periods through lines 154, 156, 158, and 169. Second and third interface timers define the duration of their respective delay or countdown periods. Output from first timer 116 is carried over lines 154 and 169 to fourth interface relay 176 through terminal 176b. Output from relay 176 is carried over line 184 from terminal 176d through terminal 102 to shock generator units 186 and 188. Fourth relay 176 is also connected through terminal 176a over line 189 to fifth interface relay 190 at terminal 190e. Terminal 190 is connected to terminal 102 through line 192 from terminal 190a. Fourth relay 176 completes the circuit to the shock generation system 38 and initiates the shock. The power is provided to the shock generating units 186 and 188 until the second time period determined by second timer 166 elapses. For the purposes of this invention, a shock of about 3 mA is sufficient.

The second interface timer 166 defines or determines the duration of the shock generated by the shock generating system 38. Once the second interface time period as defined by the second interface timer 166 elapses, output from the second timer 166 is carried over lines 194 and 208 to fifth relay 190 through terminal 190d, opening the circuit and turning off the shock generating units 186 and 188. Output from the second timer 166 is also carried over lines 194 and 198 to terminal 128b of the relay 128, thereby tripping relay 128 which breaks contact between terminals 128a and 128e which turns off piezo module 120.

As previously mentioned, third interface timer 168 is activated by first interface timer 116 output. The third interface timer defines or determines the time period or delay during which the smoke generator is activated. In addition, output from first timer 116 is carried over lines 154, 156, 169 and 200 to fifth relay 202 through terminal 202b. Relay 128 activates smoke generator 210 through lines 216 and 218 through terminals 222e and 222a of seventh interface relay 222. The smoke generators provide additional means to visually locate the motor vehicle. Smoke generators or smoke candles of having similar characteristics and qualities of the type similar to colored smoke candles sold under the brand name "Safety-Vue" by E. Vernon Hill, Inc. of Bernicia, Calif. are sufficient for the purposes of this invention. In one embodiment, after a period of approximately five seconds, third timer 168 trips seventh relay 222 through line 224 and terminal 222c which breaks the connection between sixth relay 202 and smoke generator 210, turning the smoke generator off.

Power is provided to the interface system 36 from source 96 over lines 230 and 232 to the voice synthesizer 144. Power is carried to the piezo module 120 over lines 230 and 234 through relay 112 through terminal 112c, direct wired to terminal 112a. Power is carried to a relay 106 over lines 116, 123 and 236 through terminal 106c. Power is carried over line 238 to a relay 202 through terminal 202a. Sixth relay 202 is connected to ground over line 242 through terminal 202c. Ground connections are also provided to relay 176 over line 244 through terminal 176c; relay 190 over line 246 through terminal 190c; relay 222 over line 250 from terminal 222b; and relay 106 over line 251 through terminal 106c. Ground connections are also provided to the voice synthesizer 144, and timers 116, 166, and 168, respectively through lines 252, 254, 256, and 258 respectively.

Figure 8:
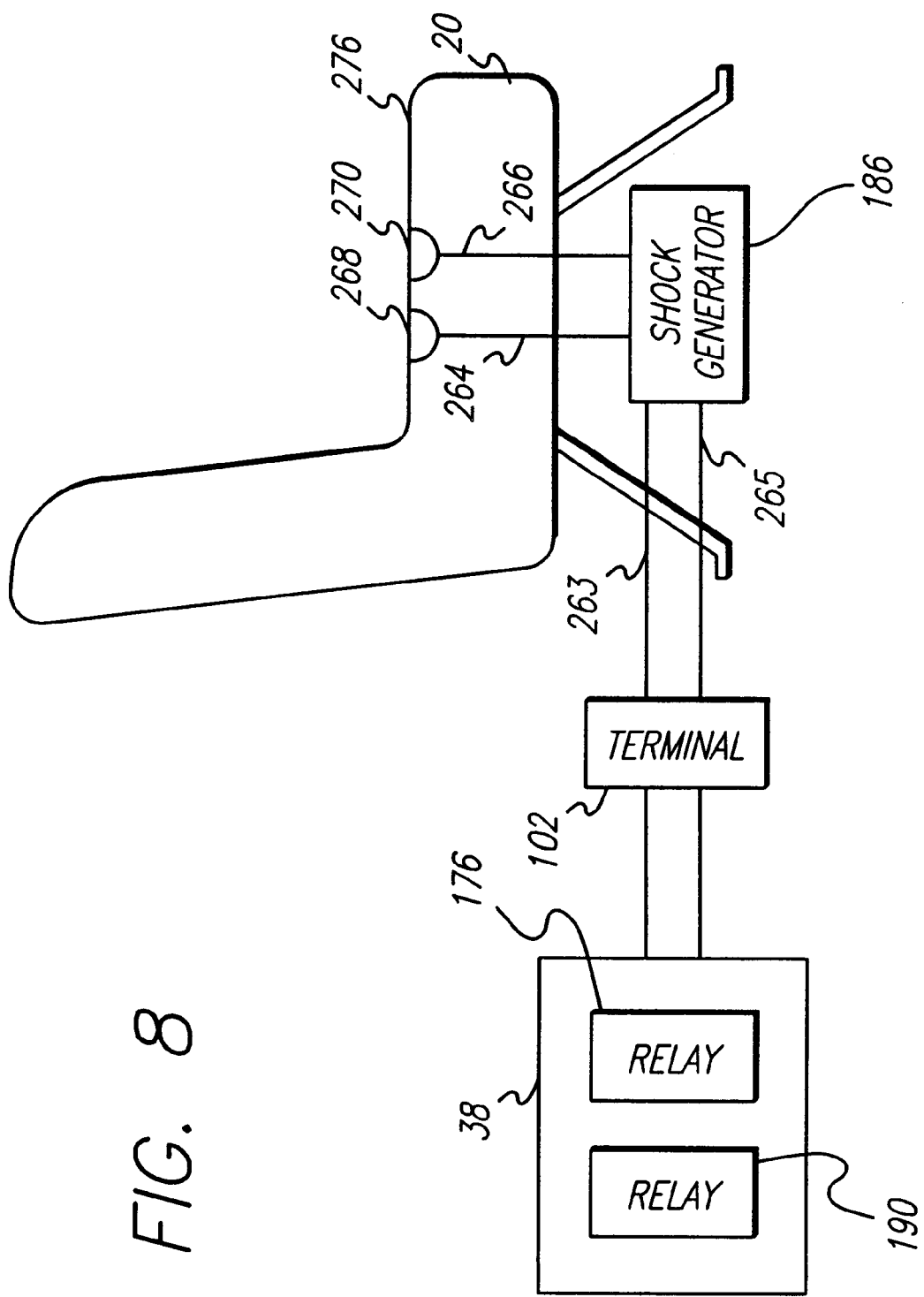
FIG. 8 is a side elevational of the shock generation system of the electrified motor vehicle theft prevention of FIG. 1.

As best shown in FIG. 8, there is shown the shock generating unit 186 embodying the features of the present invention. Relays 176 and 190 respectively, are electrically connected to at least one shock generator 186 as earlier described through terminal 102. Lines 263 and 265 carry the generated impulses from terminal 102 to the shock generator 186. Shock generators similar to the types manufactured by The Huang Plastic of Taipei Hsien, Taiwan, Republic of China; King Jay Industrial Co., Ltd. of Nan-Kang, Taipei, Taiwan, Republic of China; or distributed by Kam Electronics of Rancho Park, Calif. are sufficient for the purposes of this invention. In the preferred embodiment, one shock generator unit 186, for example, is associated with a single separate motor vehicle seat 20. The output from each shock generator 186 is carried over lines 264 and 266 to electrical contacts 268 and 270, respectively, positioned under a surface 276 of the motor vehicle seat 20. In the preferred embodiment, the electrical contacts 268 and 270 are spaced a sufficient distance apart to allow contact by the operator and the resultant closing of the circuit between the two contacts. In the preferred embodiment, a distance of about one-and-a-half inches is sufficient by opening the circuit to lines 264a, 264b, 266a, and 266b, thus preventing contacts 268a, 268b, 270a, and 270b from applying an electrical shock to the operator.

Figure 9:
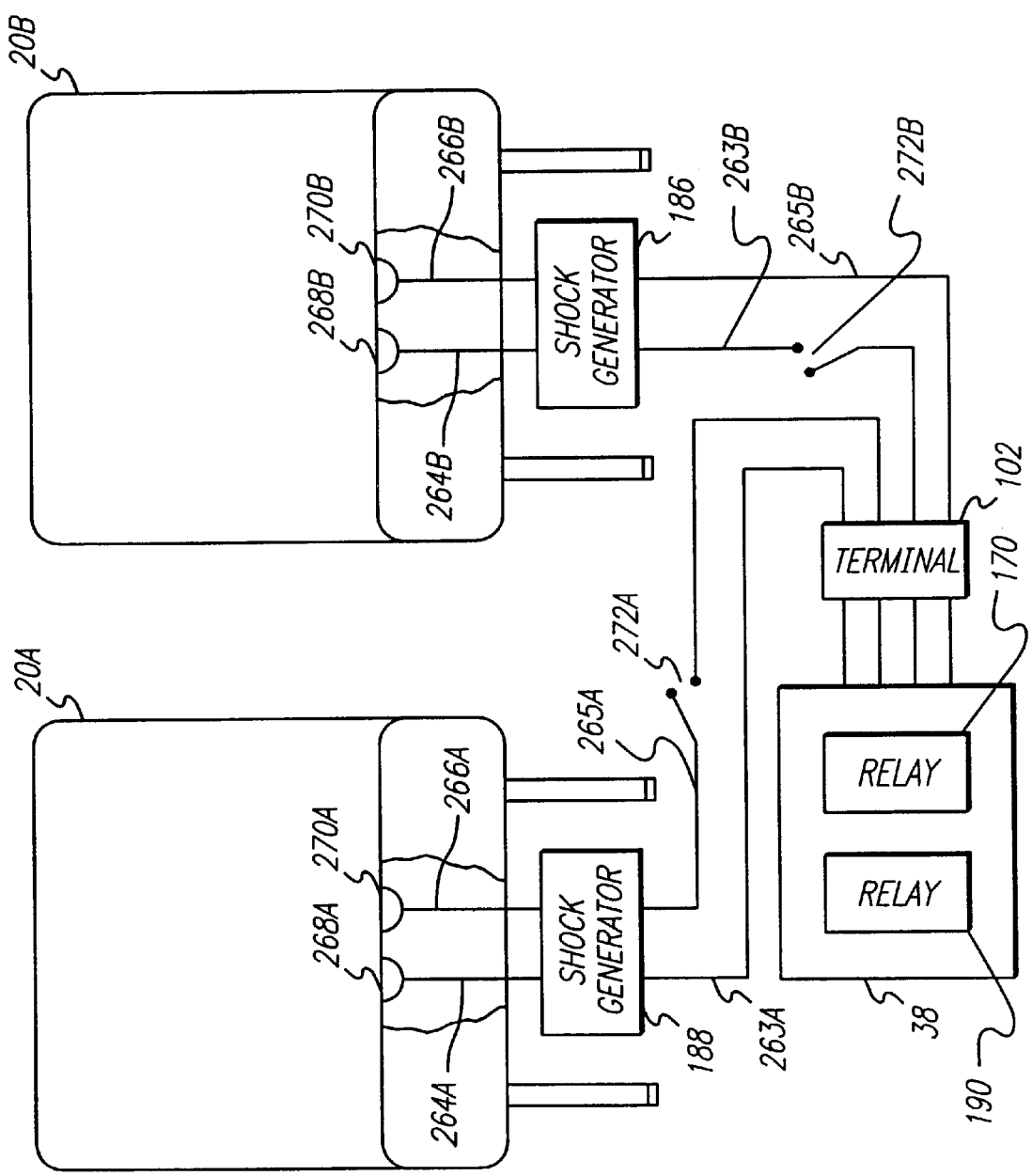
FIG. 9 is a front elevational of the shock generation system of the electrified motor vehicle theft prevention of FIG. 1.

As best shown in FIG. 9, there is shown the shock generating system 38 in combination with a driver's seat 20a and a passenger's seat 20b. In another embodiment, lines 263a, 263b, 265a, and 265b, the lines carrying the impulses from the terminal 102 to the generators 186 and 188, are routed through hidden foot switches 272a and 272b. Upon engaging the foot switches 272a or 272b, the shock maybe disengaged from the seat of the footswitch operator.

Figure 10:
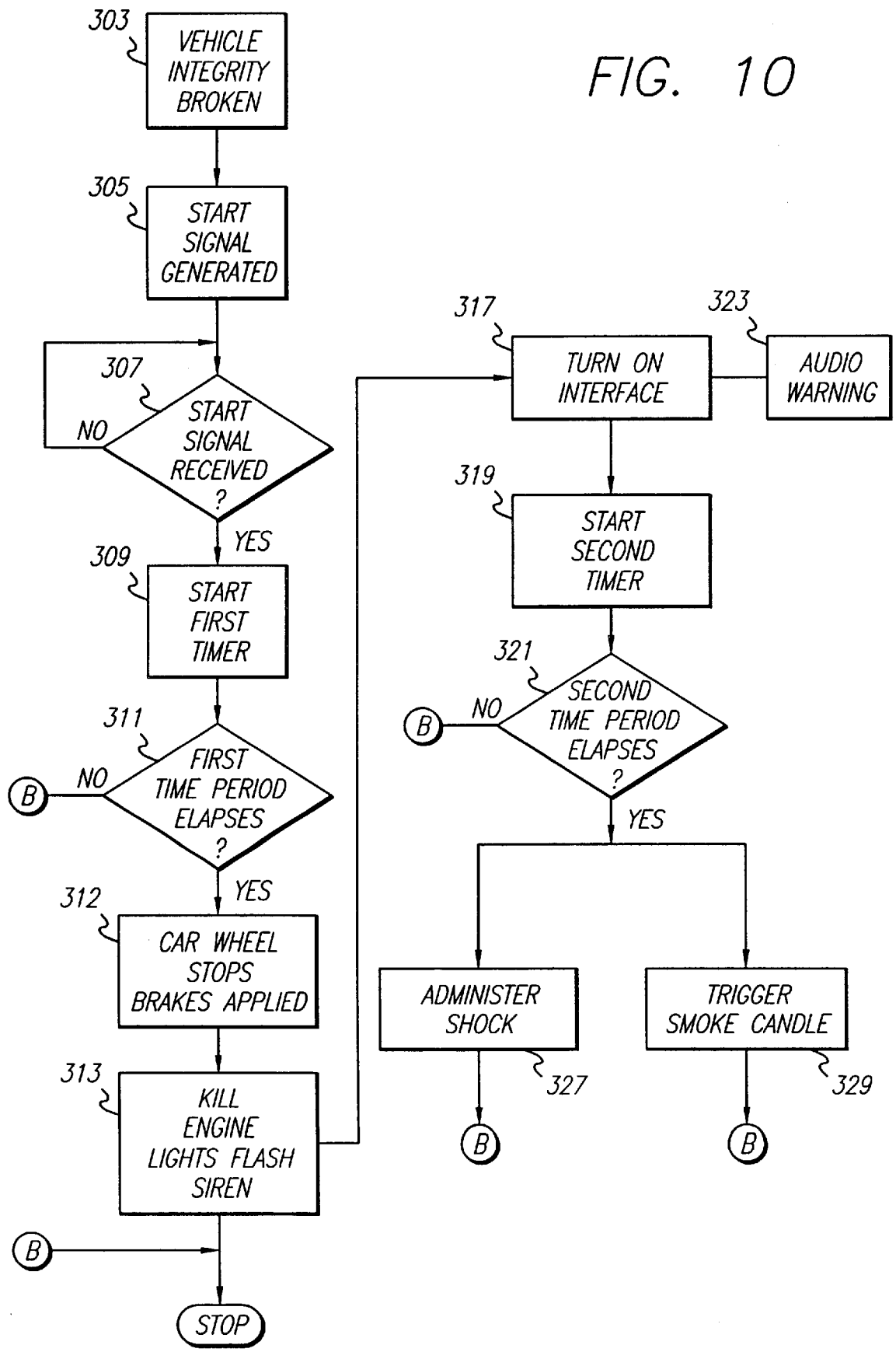
FIG. 10 is a flow chart of the system embodying the novel features of the present invention.

FIG. 10 is a flow chart illustrating the process for exposing the unauthorized operator of the motor vehicle to an electrical shock while shielding the authorized operator from the same without the need for a remote activator.

The electrified theft prevention device 8 of the present invention requires the ignition be on to trigger the system. In step 303, the integrity of the motor vehicle 10 is violated, for example the door 42 is opened. In the preferred embodiment of the present invention, the opening of a door 42 closes an electrical circuit, which in turn generates start signal in step 305. The start signal, received in step 307, activates or starts first timer 116 in step 309. The hidden reset button can be depressed at any time to reset the system in case of accidental activation. After the expiration of the predetermined time period in step 311, in the present preferred embodiment a period of about two and a half minutes, the system is primed for the receipt of the required input pre-conditions for activating the engine kill, lights flashing, and audio locator devices. In step 312, the motor vehicle 10 receives the input from the wheel rotation sensor system 32 and the brake application system 14, fulfilling the required preconditions. After receipt of the input from the wheel rotation sensor system 32 and the application of the brake systems 14, after the expiration of the first time delay period, an electrical impulse is generated in step 313 to kill the engine, flash the lights and activate a siren.

Completing of the preconditions of the wheels coming to a complete stop and the brakes being applied also generates a signal to activate the interface, step 317, to provide a warning and a time delay before activating any deterrent systems, for example, the shock or smoke generating system. This in turn activates a second timer 166, in step 319, in the preferred embodiment for a period of about thirty seconds. In conjunction with the second time period, the verbal warning is activated, warning the thief or thieves to exit the vehicle. In addition, the piezo 134 is activated at one second intervals to provide a thirty second count-down to provide additional warnings to the operator of the vehicle. After the end of the thirty second period, the shock system as well as the smoke generation system are both activated. Second and third interface timers define second and third interface delay periods, determining the duration of the shocks being applied to the operator and the duration of smoke generation. Upon elapsing of these second and third interface time delay periods, the deterrent systems, for example the shock and smoke generators, are turned off.

It will be appreciated from the foregoing that the present invention represents a significant advance in the field of motor vehicle theft prevention. In particular, the present invention provides a system that is passively armed, thus not requiring any remote controls or transmitters. The present system arms itself upon the violation of the cars integrity, the doors being opened or windows being smashed when the motor vehicle 10 is left parked or otherwise unattended. Furthermore, by requiring that both the wheels come to a complete stop and the brakes be applied after a time delay period before the activation of the theft deterrent devices, the unauthorized user is allowed to separate him or herself from the immediate location of the authorized individual. The voice module and the piezo generated warning beeps provide additional safeguards prior to the application of a shock to the seat or seats of the motor vehicle. It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A theft prevention device for use in combination with a motor vehicle for use by a driver, said motor vehicle having at least one door, two wheels, brakes attached to said wheels, and a driver's seat, said theft prevention device comprising;

separation means for allowing said motor vehicle to be moved from a first location to a second location;

sensor means to establish when said wheels have come to a complete stop at said second location;

immobilizing means for immobilizing said motor vehicle at said second location, said immobilizing means connected to said motor vehicle and electrically connected to said separation means and said sensor means, said immobilizing means activated when said motor vehicle arrives at said second location and on the condition said sensor means has established said wheels have come to a complete stop at said second location; and deterrent means for deterring a driver from using said motor vehicle, said deterrent means electrically connected to said separation means, said deterrent means activated on the condition that said motor vehicle has come to a complete stop at said second location.

2. A theft prevention device for use in combination with a motor vehicle as set forth in claim 1, wherein said sensor means is a wheel sensor means, said immobilizing means activated after the brakes of said motor vehicle have been applied and said wheel rotation sensor means has established said wheels of said motor vehicle have come to a complete stop at said second location.

3. A theft prevention device as set forth in claim 1, wherein said deterrent means includes a shock generating means for applying an electrical shock to said driver of said motor vehicle, said shock generating means positioned adjacent said driver and electrically connected to said separation means.

4. A theft prevention device as set forth in claim 3, further including warning means for generating a warning of imminent activation of said shock generating means, said warning means electrically connected to said separation means.

5. A theft prevention device for use in combination with a motor vehicle for use by a driver, said motor vehicle having at least one door, two wheels, brakes attached to said wheels, and a driver's seat, said theft prevention device comprising:

first time delay means for delaying the activation of said theft prevention device, said first time delay means defining a first time delay period;

wheel rotation sensor means to establish when said wheels have come to a complete stop after said first time delay period has elapsed at said second location;

immobilizing means, said immobilizing means connected to said motor vehicle and electrically connected to said first time delay means;

triggering means for activating said immobilizing means on the condition that said brakes of said motor vehicle have been applied and said wheels of said motor vehicle come to a complete stop after said first time delay period has elapsed as established by said wheel rotation sensor means, said triggering means electrically connected to said first time delay means and said immobilizing means;

shock generating means, said shock generating means positioned within said driver's seat and electrically connected to and activated by said triggering means; and interface time delay means for delaying activation of said shock generating means, said interface time delay means electrically connected to said triggering means and said shock generating means.

6. A theft prevention device as set forth in claim 5, further including warning means for generating a warning of the imminent activation of said shock generating means, said warning means in electrically connected to said triggering means.

7. A theft prevention device as set forth in claim 6, further including location indicator means, said location indicator means in electrical communication with said triggering means.

8. A theft prevention device for use in combination with a motor vehicle for use by a driver, said motor vehicle having at least one door, two wheels, a brake application system attached to said wheels, and a driver's seat, said theft prevention device comprising:

arming means, said arming means triggered by the opening of said at least one door;

means to indicated when said brake application system has been activated;

wheel rotation sensor means to establish when said wheels have come to a complete stop;

first time delay means for delaying the activation of said theft prevention device, said first time delay means electrically connected to and activated by said arming means, said first time delay means electrically connected to said wheel rotation sensor means and said means to indicate when said brake application system has been activated, said time delay means defining a first and second time delay periods, said first time delay period initiated by opening said at least one door, said second time delay period initiated on the condition that said brake application system has been activated and said wheel rotation sensor means establishing said wheels of said motor vehicle coming to a complete stop after the elapse of said first time delay period;

triggering means, said triggering means electrically connected to said time delay means, said triggering means activated by the application of said brakes and said wheel rotation sensor means establishing said wheels coming to the complete stop after the elapse of said first time delay period;

immobilizing means for terminating the operation of said motor vehicle, said immobilizing means connected to said motor vehicle and said triggering means, said immobilizing means activated by said triggering means;

shock generating means for deterring the use of said motor vehicle, said shock generating means positioned within said driver's seat and electrically connected to and activated by said triggering means after the elapse of said second time delay period; and interface means for delaying the activation of said shock generating means, said interface means for delaying the activation of said shock generating means electrically connected to said triggering means and said shock generating means.

9. A theft prevention device as set forth in claim 8, further including warning means for generating a warning of the activation of said shock generating means, said warning means in electrical communication with said triggering means and activated by said triggering means prior to the elapse of said second time delay period.

10. A method for deterring the theft of a motor vehicle having a driver's seat, a set of wheels and a brake application system, said method comprising the steps:

generating a first time period and a second time period;

indicating when said brake application system has been activated and said set of wheels have come to a complete stop;

triggering a theft protection system conditioned upon activation of the motor vehicle's brake application system and the complete halting of the motor vehicle's set of wheels subsequent to the elapse of the first time period;

immobilizing the motor vehicle after triggering the theft protection system;

providing an audio warning to an operator of said motor vehicle; and generating and transmitting a non-lethal electrical shock to the driver's seat of the motor vehicle after the elapse of the second time period.

11. A method for deterring the theft of a motor vehicle as set forth in claim 10, wherein said step of providing said audio warning includes the step of providing a verbal warning of imminent application of said non-lethal electrical shock to the operator of said motor vehicle.

12. A method for deterring the theft of a motor vehicle as set forth in claim 10, wherein said step of providing said audio warning includes the step of providing an audio countdown of the time remaining before the application of said non-lethal electrical shock to the operator of said motor vehicle.

13. A method for deterring the theft of a motor vehicle, said method comprising the steps:

arming a theft protection system;

generating a first and second time periods;

sensing when the wheels have come to a complete stop;

triggering the theft protection system by communicating the application of the motor vehicle's braking system and the complete stopping of the motor vehicle's wheels after the elapse of the first time period;

immobilizing the motor vehicle after triggering the theft protection system;

generating and transmitting a warning to a driver of an imminent transmittance of a non-lethal shock to the driver of the motor vehicle; and generating and transmitting said non-lethal shock to the driver's seat of the motor vehicle after the elapse of the second time period.

* * * * *